Aug. 25, 1925.
C. L. LYNCH
COUPLING FOR TRAILERS
Filed Dec. 19, 1923
1,550,729
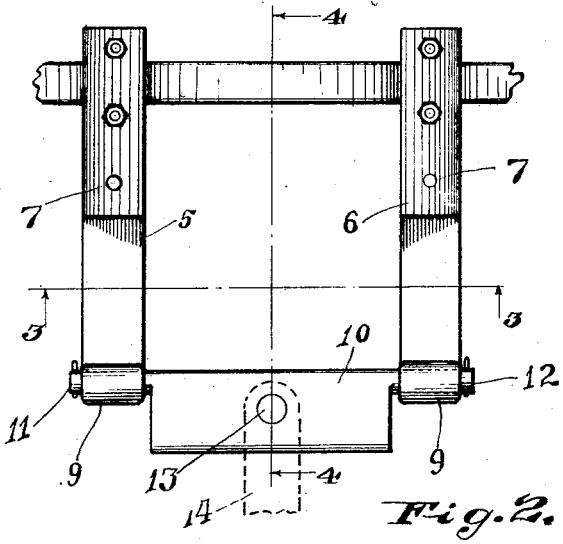
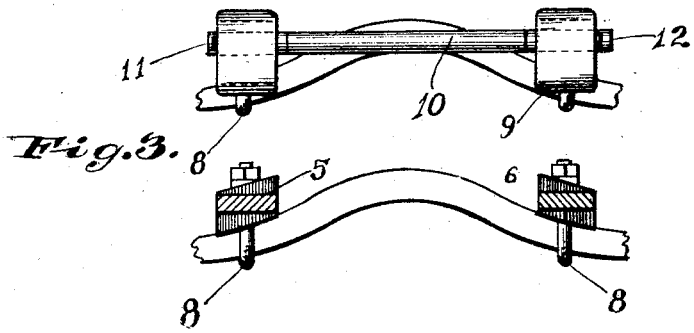
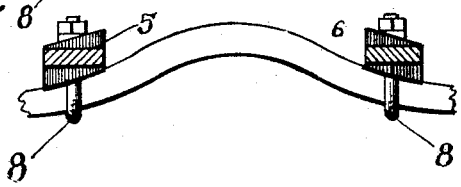
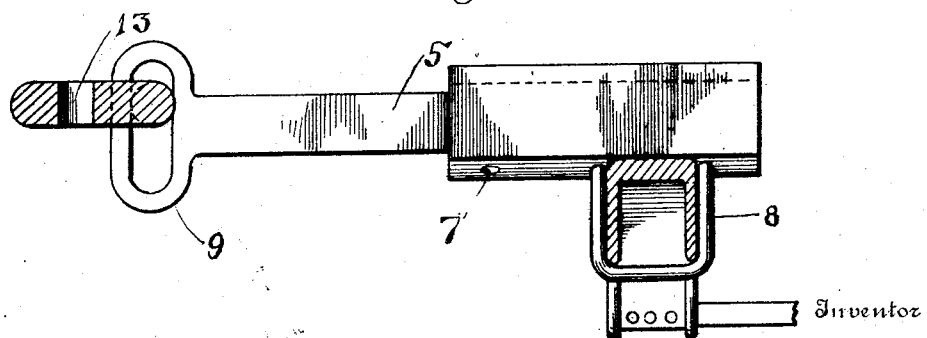
Inventor
Charles L. Lynch
By Franks Ankerman
Attorney Patented Aug. 25, 1925.

1,550,729

UNITED STATES PATENT OFFICE.

CHARLES L. LYNCH, OF SABETHA, KANSAS.

COUPLING FOR TRAILERS.

Application filed December 19, 1923. Serial No. 681,565.

*To all whom it may concern:*

Be it known that I, CHARLES L. LYNCH, a citizen of the United States of America, and resident of Sabetha, in the county of Nemaha and State of Kansas, have invented certain new and useful Improvements in Couplings for Trailers, of which the following is a specification.

This invention relates to a coupling for trailers of automobiles, and it has particular reference to the application of a device of this character to an automobile of well known construction.

It is an object of this invention to produce an attachment for the rear end of the automobile to which reference has been made, associated with means to permit the automobile or the trailer to have certain movement independently of each other to compensate for uneven roadbeds during the travel of the automobile with the trailer.

It is a further object of this invention to produce a coupling of the character indicated, having a loose member trunnioned to oscillate vertically and to assume positions diagonal to the horizontal, so that the automobile or the trailer may be free to move independently of each other, without unduly straining the elements of the coupler.

It is a further object of this invention to produce a coupler of the character indicated which can be expeditiously applied to or removed from the rear construction of the automobile.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a plan view of a coupling embodying the invention;

Figure 2 illustrates a view in front elevation thereof;

Figure 3 illustrates a sectional view on the line 3—3 of Fig. 1; and

Figure 4 illustrates a section on the line 4—4 of Fig. 1.

In these drawings, 5 and 6 denote arms provided with apertures 7 intended to receive clips 8, by which the said arms may be attached to an automobile chassis or part of the frame thereof. That portion of each arm that has the apertures and is intended to engage a portion of the chassis frame has its under surface beveled to conform to the contour of that portion of the chassis frame to which it is to be applied.

Preferably, each arm is reduced in thickness toward its outer end or the end remote from its anchorage, and each arm terminates in a vertically slotted head 9. The arms are, of course, rigid with the chassis frame, and the slotted heads are intended to receive the shackle or coupling element to permit the free movement indicated, that will relieve the springs of the automobile of the strain which would result from a rigid connection between the parts.

The toggle or coupling member 10 has trunnions 11 and 12 that enter the slots of the heads, and these trunnions are of such length as to remain in engagement with the heads, even though the toggle assumes a diagonal position with one of the trunnions near the top of one head and the other trunnion near the bottom of the other head. It is desirable that this movement be accorded the toggle in order that the trailer or the automobile may rise or descend at the sides and have independent rising and descending movements at the ends, without, as stated, creating undue strain on the parts of the coupling. The trunnions are so mounted in the heads as to have partial rotary movement and oscillatory movement, and the axial movement of the trunnions is limited by reason of the fact that the toggle is enlarged between the arms and will engage the inner edges of the heads of the arms to prevent undue movement, tending to disengage the trunnions from the heads.

The toggle has an aperture 13 to receive a pin for the coupling bar 14 or the like, but the means by which the trailer is connected to the toggle may be changed to suit particular requirements without departing from the scope of the invention.

I claim:

1. In a coupling for an automobile and a trailer, a pair of parallel arms adapted to be connected at their rear ends to a cross member of the frame of an automobile, said arms having vertically slotted heads at the ends remote from their points of connection with the chassis, a transverse member having trunnions rotatable and oscillatable in the said slots of the heads, the said cross member having between its trunnions a forwardly extending portion to which a draft bar is attached, and means for limiting the motion of the trunnions axially.

2. In a coupling for an automobile and a trailer, arms having beveled surfaces conforming to the contour of the part of the chassis frame which they engage, means for attaching the said arms to the said frame, vertically slotted heads on the arms at the ends remote from their anchorage, a toggle having trunnions rotatable and slidable in the slots of the heads and adapted to be connected to a trailer, substantially as described.

CHARLES L. LYNCH.